2,783,260

DEODORIZATION OF HYDROGENATED FATTY OILS

Dwight R. Merker, Chicago, Ill., assignor to Swift & Company, Chicago, Ill., a corporation of Illinois No Drawing. Application April 2, 1953,
Serial No. 346,528

5 Claims. (Cl. 260—424)

The present invention relates in general to the treatment of hydrogenated fatty oils. More specifically, the invention is directed to the removal of hydrogenation odors from hydrogenated fatty oils.

Hydrogenation of vegetable oils is widely practiced for the purpose of producing a hardened vegetable oil to be used in the production of margarine or shortening. Much difficulty has accompanied this particular treatment inasmuch as hydrogenation odors, which are highly undesirable, are formed. These odors, present in hydrogenated oils, must be removed before the oil may be successfully incorporated in an edible product such as margarine inasmuch as the odors are responsible for undesirable flavor in the product. Many efforts have been made to devise methods for removing these odors, but no substantial success has been realized aside from steam deodorization which is customarily used to remove these odors. Other efforts have been made to chemically treat the oil for the purpose of removing the odor-forming constituents. Some success has been realized by these particular treatments, but such success has been only partial as it has been noted that not all odor-forming constitutents were removed.

It is therefore an object of the present invention to treat hydrogenated fatty oils in such a manner as to remove hydrogenation odors therefrom.

It is another object to deodorize hydrogenated fatty oils so as to produce a hardened oil having a desirable flavor.

Still other objects, not specifically set forth, will become apparent from the following detailed description.

Generally, the present invention comprises the steps of adding a quantity of phosphoric acid to a hydrogenated fatty oil, maintaining the mixture at an elevated temperature for a period of time while injecting air therein, adding a neutral bleaching earth to the mixture, terminating the injection of air, raising the temperature of the mixture and maintaining the mixture at this raised temperature for a period of time, and thereafter cooling the mixture and removing the solid constituents therefrom by filtration.

It has been found that the treatment of hardened vegetable oils with phosphoric acid and a neutral bleaching earth in the presence of air and under elevated temperature conditions substantially removes hydrogenation odors from the hydrogenated oil. It has also been found that not only is the oil deodorized but it is substantially stabilized against odor and flavor reversion. Deodorized fatty oils are noted for their tendency to revert back to a condition in which undesirable odors are again present. The reason for this tendency is not completely clear, but it is believed that the hydrogenation odor-forming constituents are not sufficiently modified or removed under customary deodorization techniques but instead are only temporarily inactivated. These odor-forming constituents normally become active again upon subsequent storage. The stabilization that occurs as a result of deodorizing fatty oils in accordance with the teachings of the present invention is most desirable. The resultant oil is substantially odorless and is also substantially stabilized against odor and flavor reversion.

In the present process the hydrogenated oil may be treated with a comparatively substantial amount of phosphoric acid (0.5 to 4 percent by weight) which is added to the oil in an open tank while the oil is maintained under constant agitation conditions. The phosphoric acid utilized is preferably a 75 percent solution, but other concentrations may be satisfactorily utilized. Air is injected into the open tank and thoroughly admixed with the mixture of oil and phosphoric acid while the temperature of the mixture is maintained within the range of 60° to 95° C. The aeration and agitation of the mixture is continued under these particular temperature conditions for a period of about ½ to 1 hour. At the end of this particular phase of treatment, the aeration is terminated and from 1 to 6 percent (by weight) of a neutral bleaching earth is added to the heated mixture while agitation of the mixture is continued. At this stage of the treatment it is not necessary to add to the mixture the entire amount of bleaching earth to be used. A portion may be added at this point and the remainder may be introduced while cooling the mixture prior to filtration. Such use of the bleaching earth depends on the circumstances and it may be most profitable either to split the addition of the bleaching earth as set forth above or to utilize its action all at one time.

The temperature of the mixture is then raised to approximately 130° to 140° C., and this particular phase of the treatment is carried out for a period of from about ½ to 1 hour. During this second phase of the treatment, the typical odors of hydrogenation disappear. In most instances the oil so treated still possesses other slight odors and flavors which may be removed by a subsequent deodorization step carried out by any well-known method such as steam distillation. It is also noted that at this particular phase of the treatment the oil has a negligible peroxide value. This latter condition apparently is due to the fact that the peroxides are absorbed or decomposed by the bleaching earth which has become acidic. The bleaching earth at this point acquires a dark color due to removal of impurities from the oil. Following the bleaching and high temperature phase, the oil is cooled to a temperature below 100° C. and thereafter filtered. Elution of the filter cake with acetone gives a reddish colored solution which apparently is made up of the odor-forming constituents originally present in the untreated oil.

Oil treated in accordance with the teachings of the present invention should be low in free fatty acid content. For maximum results the free fatty acid content should be less than 0.1 percent. If the oil to be treated has a free fatty acid content greater than 0.1 percent, it is advisable to subject the oil to alkali refining, in accordance with methods well-known in the art, prior to subjecting the oil to treatment by the present process.

The following specific examples are set forth as illustrative only of the present invention and are not to be construed as limiting thereto.

Example 1

Two percent (by weight) of a 75 percent solution of phosphoric acid was added to a quantity of well agitated hardened soybean oil (Zeiss butyro Refractive Index 41.0) in an open tank into which air was injected. The temperature of the mixture was raised to within the range of 90° to 95° C. and held within this range for 30 minutes. Following the above treatment, the injection of air was terminated and, while agitation was maintained, 4 percent (by weight) neutral bleaching earth was added to the mixture. The temperature of the agitated mixture was then raised to 135° C. and held there for 30 minutes. The oil was then cooled immediately to a temperature of 60° C., filtered, and steam deodorized at 235° C. for 3 hours. A control sample of the original hardened oil was steam deodorized at 235° C. for 3 hours in the conventional manner. Both the control sample and a sample of the oil treated in accordance with the teaching of the present invention were incubated in an oven for 1 week at a temperature of 140° F. The control sample was completely reverted whereas the treated sample was just beginning to develop an off flavor. Actually, the control sample was unacceptable in flavor after 2 days' incubation.

*Example II*

Hardened cottonseed oil (Zeiss butyro Refractive Index 41.0) was treated in the same manner as set forth in Example I. The flavor stability of a sample of the treated oil was compared with a control that had been steam deodorized only. The control oil had reverted after 3 days, whereas the treated oil was stable for approximately a week.

*Example III*

When hardened whale oil (Zeiss butyro Refractive Index 42.0) was treated as set forth in Example I, an almost colorless oil was obtained that did not begin to revert until after 3 days in an oven at 140° F. A steam deodorized control sample was highly colored and reverted in less than a day under the incubation conditions.

Fatty oils treated in the manner as shown in the examples exhibit flavor stability during subsequent storage. The typical odors of hydrogenation are removed and odor reversion normally found in oil treated according to known practices is greatly retarded. The amount of phosphoric acid utilized may range from 0.5 to 4 percent by weight where the use of a 75 percent solution is involved. The neutral bleaching earths which may be utilized are those normally known in the art, such as fuller's earth, kieselguhr, etc.

The odor which is present following the bleaching step may be removed by a subsequent deodorization step according to practices well-known in the art. This subsequent deodorization step may not always be necessary. However, normally such a step is necessary and may be carried out by the use of steam, gas, volatile organic liquids, etc. When such a deodorization step is necessary it has been noted that the time normally required under conventional conditions is greatly reduced. Normally, conventional deodorization is carried on for a period of from 3 to 6 hours. When material treated according to the teachings of the present invention is subjected to conventional deodorization the time required is from ½ to 3 hours. Such deodorization is carried out within a temperature range of from 200° C. to 260° C.

It is considered necessary that oxygen be present during the acid treating phase in order to attain the desired results. It has been found that, if the treatment is carried out under nonoxidizing conditions, such as under an atmosphere of nitrogen or in vacuo, the odors of hydrogenation are not removed and the flavor stability of the oil is not as great.

Obviously, many modifications and variations of the invention as hereinbefore set forth may be made without departing from the spirit and scope thereof, and therefore only such limitations should be imposed as are indicated in the appended claims.

I claim:

1. The process of removing hydrogenation odors and flavors from fatty oils which comprises: adding concentrated phosphoric acid to a hydrogenated fatty oil in an amount greater than about 0.5 percent based on the weight of the oil; heating the mixture of acid and oil to a temperature of 60 to 95° C. for at least about one-half hour while subjecting said mixture to aeration and agitation; adding to the aerated mixture at said temperature an amount of bleaching earth; thereafter increasing the temperature of said mixture to about 130° C.–140° C. for at least about one-half hour while maintaining agitation, and then cooling and filtering the mixture to remove said bleaching earth and impurities absorbed therein.

2. The process of removing hydrogenation odors and flavors from fatty oils which comprises: adding concentrated phosphoric acid to a hydrogenated fatty oil in an amount greater than about 0.5 percent based on the weight of the oil; heating the mixture of acid and oil to an elevated temperature within the range of about 65° C. to about 95° C. for about one-half to one hour while subjecting the mixture to aeration and agitation; adding to the aerated mixture at said elevated temperature an amount of bleaching earth; thereafter increasing the temperature of said mixture to about 130° C.–140° C. for about one-half to one hour while maintaining agitation to insure full bleaching action, and then cooling and filtering the mixture to remove said bleaching earth and impurities absorbed therein.

3. The process of removing hydrogenation odors and flavors from fatty oils which comprises: adding concentrated phosphoric acid to a hydrogenated fatty oil in an amount greater than about 0.5 percent based on the weight of said oil; heating the mixture to an elevated temperature within the range of about 60° C. to about 95° C. for a period of about one-half hour while subjecting the mixture to aeration and agitation; adding to the aerated mixture at said elevated temperature an amount of bleaching earth; thereafter increasing the temperature of said mixture to within the range of about 130°–140° C. for about one-half hour while maintaining agitation to insure full bleaching action, and then cooling and filtering the mixture to remove said bleaching earth and absorbed impurities.

4. The process of removing hydrogenation odors and flavors from fatty oils which comprises: forming a mixture of oil and concentrated phosphoric acid, said acid being present in an amount greater than about 0.5 percent based on the weight of the oil; heating said mixture to a temperature of about 60° to 95° C. for a period of at least about one-half hour while maintaining aeration and agitation thereof; adding bleaching earth to said mixture and reheating said newly formed mixture to a temperature of about 130°–140° C. for at least about one-half hour; cooling said newly formed mixture and adding additional bleaching earth thereto; and thereafter filtering the resultant mixture.

5. The process of deodorizing hydrogenated fatty oils which comprises: forming a mixture of oil and concentrated phosphoric acid, said acid being present in an amount greater than about 0.5 percent based on the weight of the oil; heating said mixture to about 60°–95° C. for at least about one-half hour while maintaining aeration and agitation thereof; adding bleaching earth to said mixture and reheating said newly formed mixture to about 130°–140° C. for at least about one-half hour; cooling said newly formed mixture followed by filtering thereof, and thereafter subjecting the treated oil to gaseous distillation.

References Cited in the file of this patent

UNITED STATES PATENTS

| Number | Name | Date |
|---|---|---|
| 542,758 | Freyss | July 16, 1895 |
| 1,744,843 | Taylor et al. | Jan. 28, 1930 |
| 1,964,875 | Freiburg | July 3, 1934 |
| 1,973,790 | Appleton | Sept. 18, 1934 |
| 2,308,848 | Young et al. | Jan. 19, 1943 |
| 2,413,009 | Taussky | Dec. 24, 1946 |
| 2,468,753 | Henderson | May 3, 1949 |
| 2,587,954 | Babayan | Mar. 4, 1952 |